United States Patent [19]

Liu

[11] Patent Number: 5,133,524

[45] Date of Patent: Jul. 28, 1992

[54] SUCTION CUP DEVICE

[76] Inventor: Bao-Shen Liu, 3rd fl., 20 Alley 6, Lane 190, Te Hsing E. Rd., Shih Lin District, Taipei, Taiwan

[21] Appl. No.: 654,076

[22] Filed: Feb. 11, 1991

[51] Int. Cl.$^5$ .............................................. F16B 47/00
[52] U.S. Cl. ................................ 248/205.8; 248/363; 248/309.3
[58] Field of Search .............. 248/205.6, 205.7, 205.8, 248/205.9, 206.1, 206.2, 362, 363, 309.3, 683

[56] References Cited

U.S. PATENT DOCUMENTS

| | | | |
|---|---|---|---|
| 2,940,713 | 6/1960 | Van Dusen | 248/205.8 |
| 4,043,531 | 8/1977 | Green | 248/205.8 X |
| 4,453,285 | 6/1984 | van Rosberg | 248/205.8 X |

FOREIGN PATENT DOCUMENTS

| | | | |
|---|---|---|---|
| 1915483 | 7/1970 | Fed. Rep. of Germany | 248/205.8 |
| 1560077 | 3/1969 | France | 248/205.8 |
| 1569052 | 5/1969 | France | 248/205.8 |
| 0699748 | 11/1953 | United Kingdom | 248/205.8 |
| 0993084 | 5/1965 | United Kingdom | 248/205.8 |

Primary Examiner—Ramon O. Ramirez
Attorney, Agent, or Firm—Ladas & Parry

[57] ABSTRACT

A sucker being diversified and/or improved and/or more endurable and/or more effective and/or convenient and/or multi-functional and/or more efficient is provided. The sucker includes a downwardly concave sucking body to be pressed against an attaching surface to vacuumize the room defined therebetween, a downwardly concave resilient member superimposed above the sucking body and having a periphery and a plurality of grooves, and a connector connecting together the sucking body and the resilient member in the manner that after the sucking body has been pressed against the attaching surface, the resilient member will tend to urge the sucking body away from the attaching surface which will in turn result in that the sucking body is more securely attached to the attaching surface.

20 Claims, 6 Drawing Sheets 5,133,524

SUCTION CUP DEVICE

BACKGROUND OF THE INVENTION

The present invention relates to a Suction Cup Device, and more particularly to one for daily use.

It is not seldom found that the conventional sucker fails to normally function due to factors including the deformation or the aging or the hardening of the used material and the change of the ambient temperature, moisture or atmospheric pressure, any of which probably leads to the fact that the air molecules run into the room between the sucker and the flat surface attaching thereto the sucker which explains why the sucker fails to desiredly work. To the Applicant's knowledge, the human being stands helpless before the above problem till now. It is therefore tried by the Applicant to deal with the above problem encountered by the prior art.

SUMMARY OF THE INVENTION

It is therefore an object of the present invention to provide a functionally and/or apparently diversified sucker.

It is further an object of the present invention to provide a more effective and/or convenient sucker. It is additional an object of the present invention to provide a longstandingly functioning sucker.

According to the present invention, a sucker includes a sucking body having a downwardly concave surface to be downwardly pressed against an attaching surface to vacuumize the room therebetween so that the sucking body can be attached to the attaching surface, a downwardly concave resilient member superimposed above the sucking body and having a periphery and a plurality of grooves beginning from the periphery, and a connector connecting together the sucking body and the resilient member in the manner that after the sucking body has been pressed against the attaching surface, the resilient member will tend to urge the sucking body away from the attaching surface which will in turn result in that the sucking body is more effectively attached to the attaching surface.

The present invention may best be understood through the following description with reference to the accompanying drawings, in which:

BRIEF DESCRIPTION OF THE DRAWING

FIG. 1-1 is a top view showing a sucker in FIG. 1;

FIG. 1-2 is a sectional view taken along the line 1-2/1-2 in FIG. 1-1;

FIG. 1-3 is a sectional view showing a sucker in FIG. 1 being pressed against a flat surface;

FIG. 1-4 is a sectional view showing a sucker in FIG. 1-3 after released;

FIG. 1-5 is a sectional view showing a second preferred embodiment of a sucker according to the present invention;

FIG. 1-6 is a sectional view showing a sucker in FIG. 1-5 being attached to an irregular attaching surface;

FIG. 2 is a top view showing a third preferred embodiment of a sucker according to the present invention;

FIG. 3 is a top view showing a fourth preferred embodiment of a sucker according to the present invention;

FIG. 4 is a perspective view showing a fifth preferred embodiment of a sucker according to the present invention;

FIG. 5 is a perspective view showing a sixth preferred embodiment of a sucker according to the present invention;

FIG. 6 is a perspective view showing a seventh preferred embodiment of a sucker according to the present invention.

FIG. 6-1 is a sectional view taken along the line 6-1/6-1 in FIG. 6.

FIG. 7-1 is a sectional view showing a ninth preferred embodiment of a sucker according to the present invention;

FIG. 7-2 is a sectional view showing a tenth preferred embodiment of a sucker according to the present invention;

FIG. 7-3 is a sectional view showing an eleventh preferred embodiment of a sucker according to the present invention;

FIG. 8-1 is a sectional view taken along Line 8-1/8-1 in FIG. 8;

DETAILED DESCRIPTION OF THE PREFERRED EMBODIMENT

Figure 1:
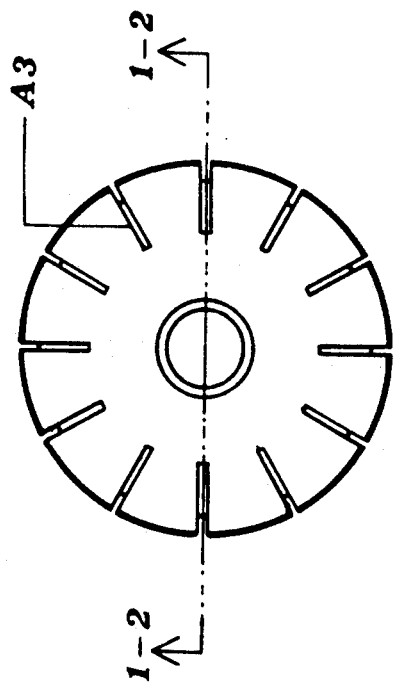
FIG. 1 is a fragmentarily perspective view showing a preferred embodiment of a sucker according to the present invention.
Figures 1, 2:
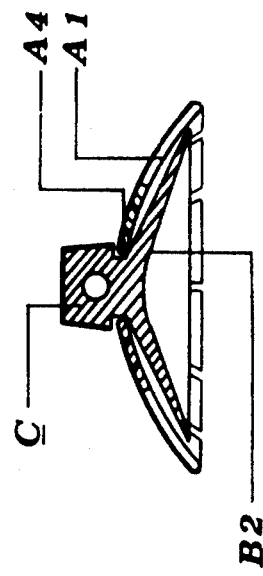
Figure 1:
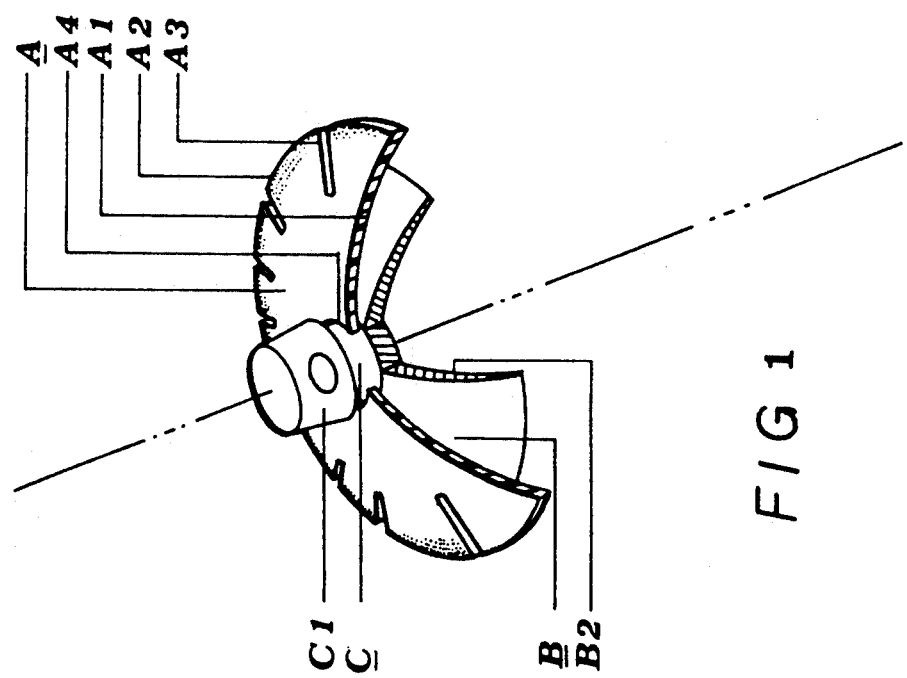
Figures 1, 2, 3:
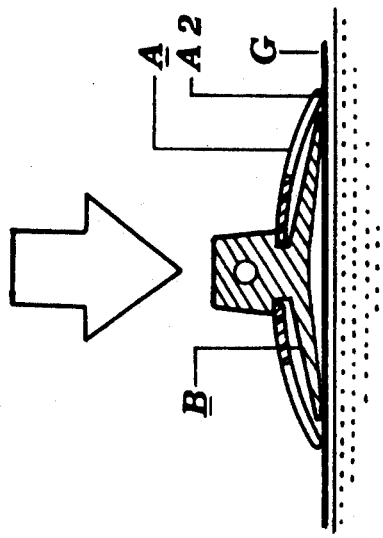
Figures 1, 2, 3, 4:
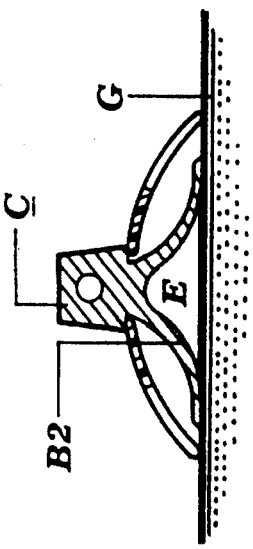

Referring now to FIG. 1-FIG. 1-4, there is shown a sucker according to the present invention which includes a sucking body B having a downwardly concave surface B2, a connector C integrally formed to sucking body B and having an enlarged upper portion C1, and a resilient member A which is superimposed above sucking body B and includes a downwardly concave surface A1, a periphery A2 and a plurality of grooves A3 beginning from periphery A2 and oriented toward a central opening A4 capable of compelledly passing therethrough upper portion C1 to enable resilient member A to be retained by upper portion C1. In use, the present sucker is pressed against a flat attaching surface G as shown in FIG. 1-3 to discharge the air out of the room E defined between sucking body B and flat surface G to thus attach sucking body B to attaching surface G. After released, resilient member A tends to urge sucking body B away from attaching surface G as shown in FIG. 1-4 which forms a compulsive vacuum state in room E so that sucking body B is more effectively attached to attaching surface G since the air in room E gets in no way saturated no matter what the environmental temperature or atmospheric pressure may change.

As shown in FIG. 1-5, resilient member A can be smaller than sucking body B having a peripheral portion B4 in area so that periphery A2 can help urge peripheral portion B4 against attaching surface G which is advantageous in effectively preventing the environmental air from running into the room E should sucking body B have a deformation due to the change of the environmental temperature or moisture.

As shown in FIG. 1-6, since member A is resilient and has grooves A3 so that periphery A2 is sufficiently flexible in different positions thereof, resilient member A can help sucking body B attach itself to an irregular attaching surface G1. Certainly, the number of grooves A3 can be desiredly varied to cope with the need of a particular situation.

As shown in FIGS. 2 & 3, a resilient member A according to the present invention can alternatively have curvy grooves S or grooves R each of which has an elliptical portion and a straight portion.

Figures 1, 2, 3, 4, 5:
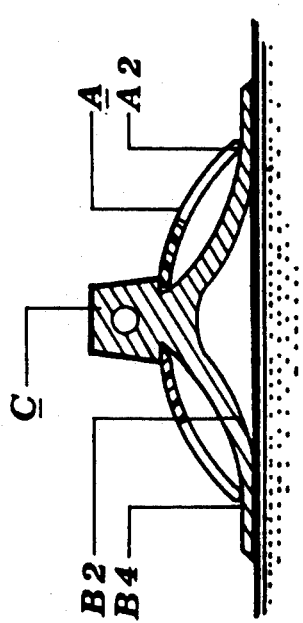

As shown in FIG. 4, since periphery A2 can help peripheral portion B4 to attach itself to the attaching surface, a sucker according to the present invention can be generally rectangular. Connector C can have a transverse through hole C2 through which a stopper M can pass to stop thereunder resilient member A. As shown in FIG. 5, the present sucker can be generally elliptical and connector C can have the upper portion thereof engage thereunder a C-shaped stopper N stopping thereunder resilient member A.

Figures 1, 2, 3, 4, 5, 6:
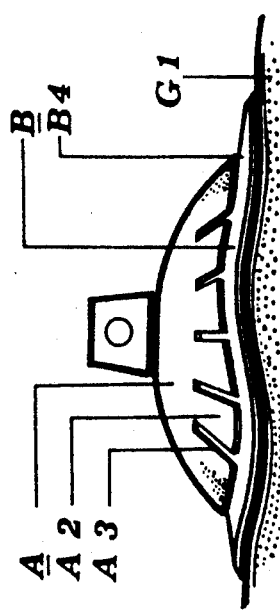
Figure 2:
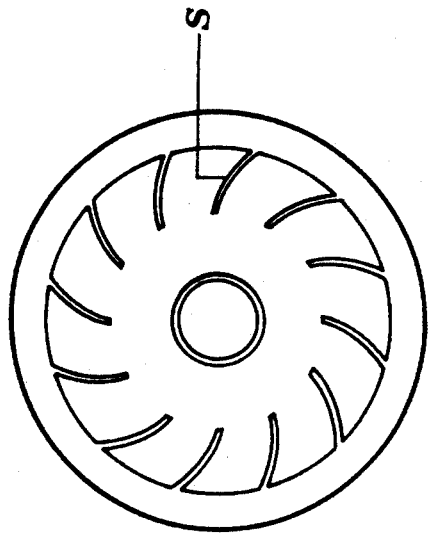
Figure 3:
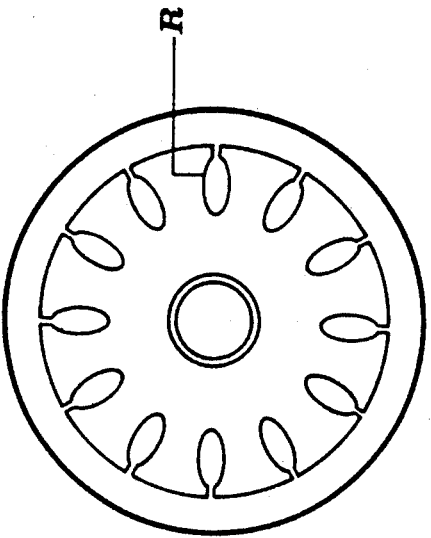
Figure 4:
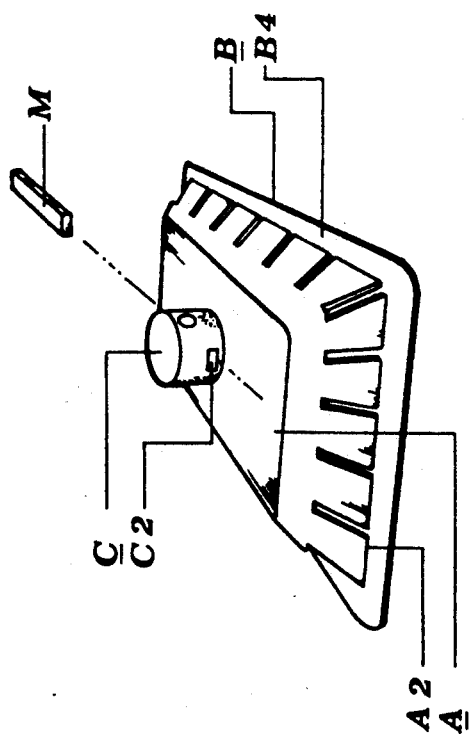
Figure 5:
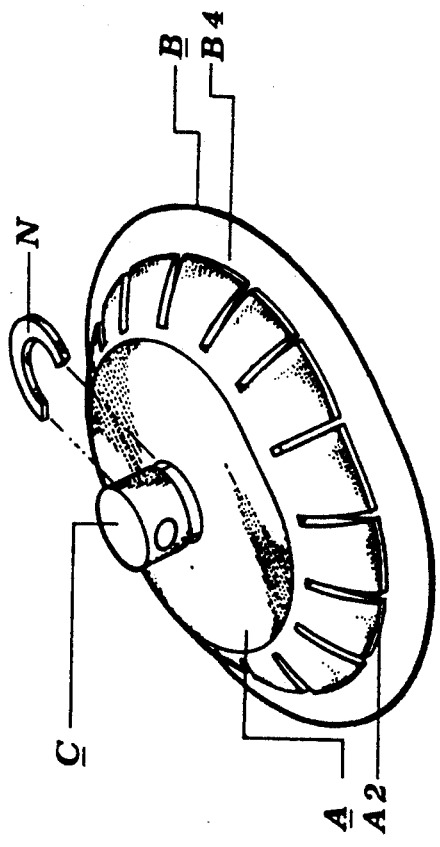
Figure 6:
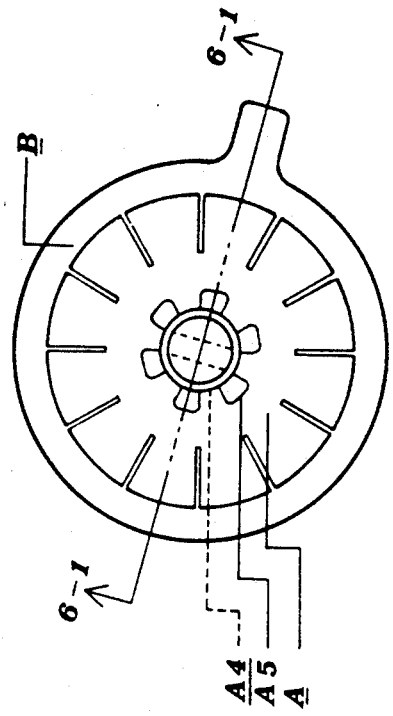
Figures 1, 6:
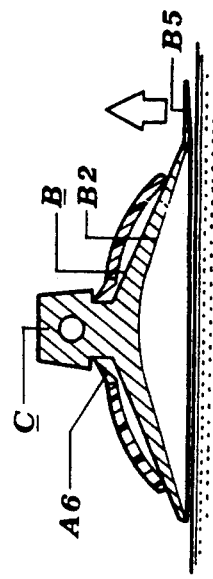

As shown in FIGS. 6 & 6-1, central opening A4 of member A can further include extensions A5 to be gear-shaped so that compelledly passing upper portion C1 of connector C through central opening A4 is made easier. Certainly, the toothed portions A6 of member A can be tapered to further ease the engagement between connector C and member A. In order that the present sucker can easily be detached from the attaching surface, sucking body B is provided with an extension B5 capable of being upwardly pulled to allow the air to run into the room between sucking body B and the attaching surface.

Figure 7:
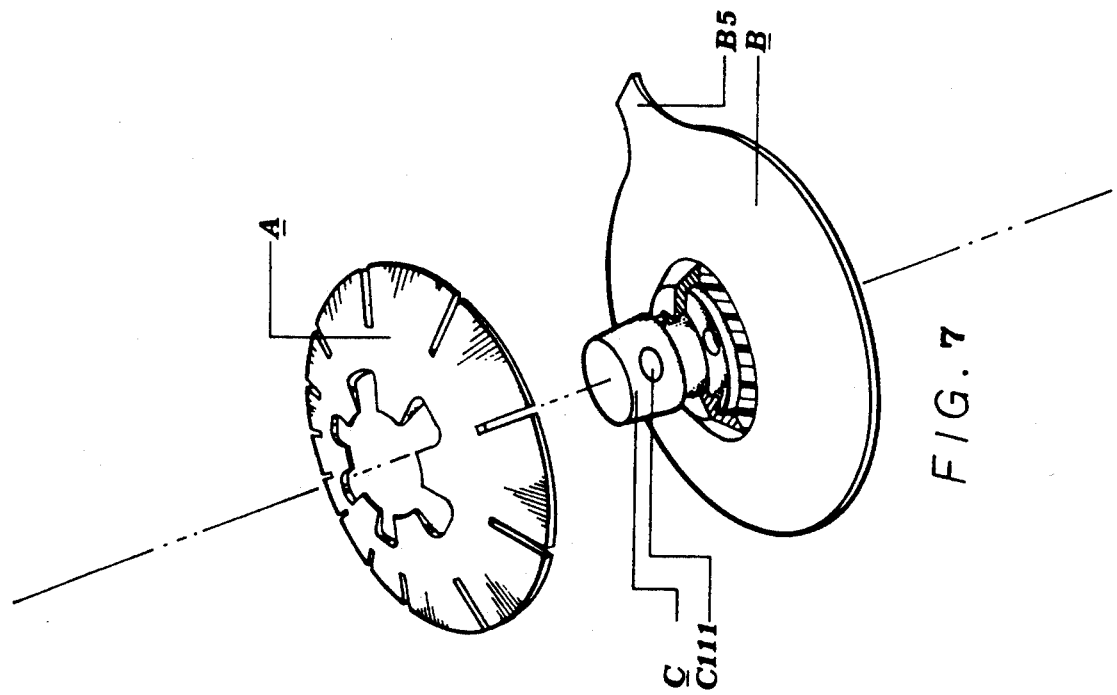
FIG. 7 is an exploded view showing an eighth preferred embodiment of a sucker according to the present invention.
Figures 1, 7:
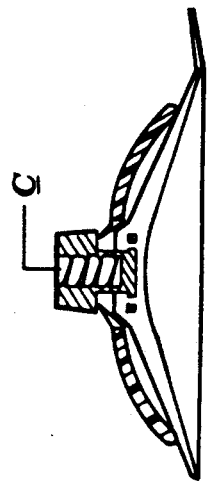
Figures 2, 7:
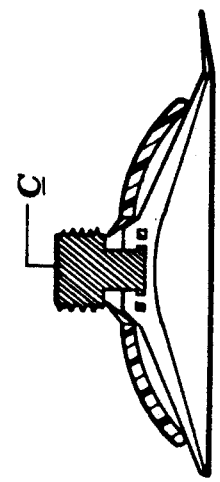
Figures 3, 7:
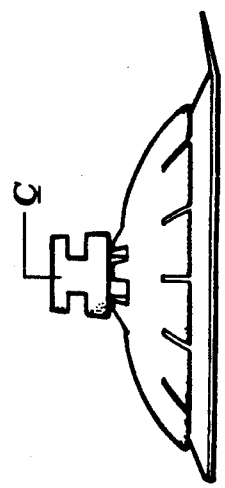

As shown in FIG. 7, connector C having a transverse through hole C111 can be independent of sucking body B but partly implanted therein during manufacturing sucking body B so that connector C can be made of a rigider material in order that a strongly resilient member A can be introduced to the present sucker since sucking body B integrally forming thereto connector C as shown in the previous examples is made of a relatively soft material so that the soft connector C tends to be deformed or damaged to fail to desiredly function if a strongly resilient member A is used. As shown in FIGS. 7-1, 7-2 & 7-3, the independent connector C can have an upper portion having an inner thread, an outer thread or a 90 degree-turnedly H-shaped crosssection so that connector C can easily be engaged to an article desired to be or capable of being attached to an attaching surface by a sucker.

Figure 8:
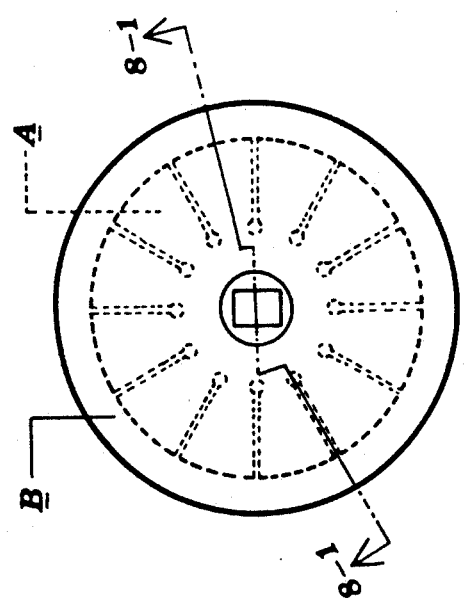
FIG. 8 is a top view showing a twelfth preferred embodiment of a sucker according to the present invention.
Figures 1, 8:
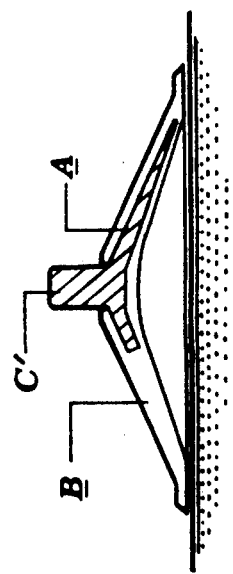

As shown in FIGS. 8 & 8-1, connector C' can alternatively be integrally formed to resilient member A implanted into sucking body B. Certainly, connector C' in this embodiment can also have an upper portion of different structure as described in the foregoing embodiment.

Figure 9:
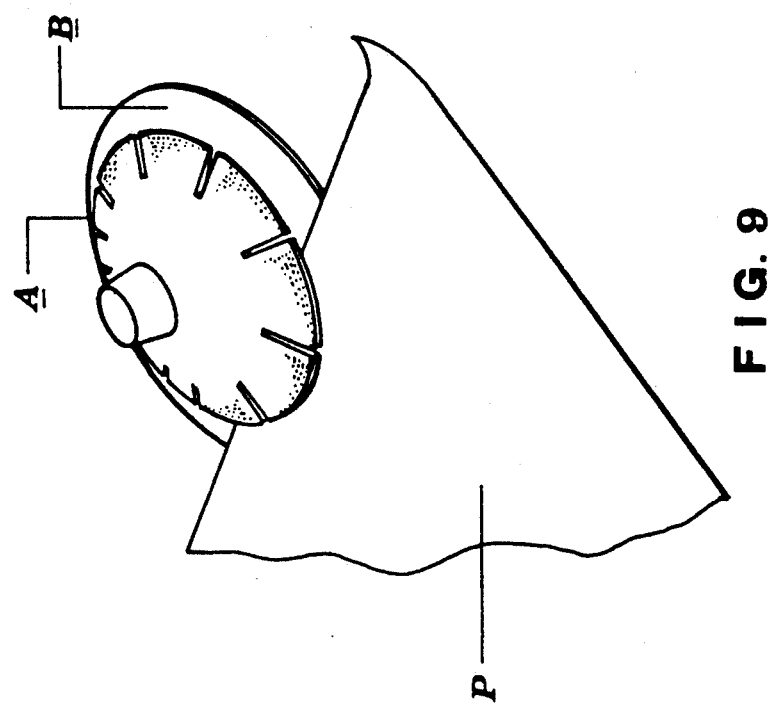
FIG. 9 is a perspective view showing a sucker in FIG. 1-5 in use.

As shown in FIG. 9, a sheet article or a paper P can be securely clamped between resilient member A and sucking body B attached to an attaching surface so that an adhesive or a tack or the like can be dispensed with in order that the attaching surface always maintains its cleanliness and smoothness.

Figure 10:
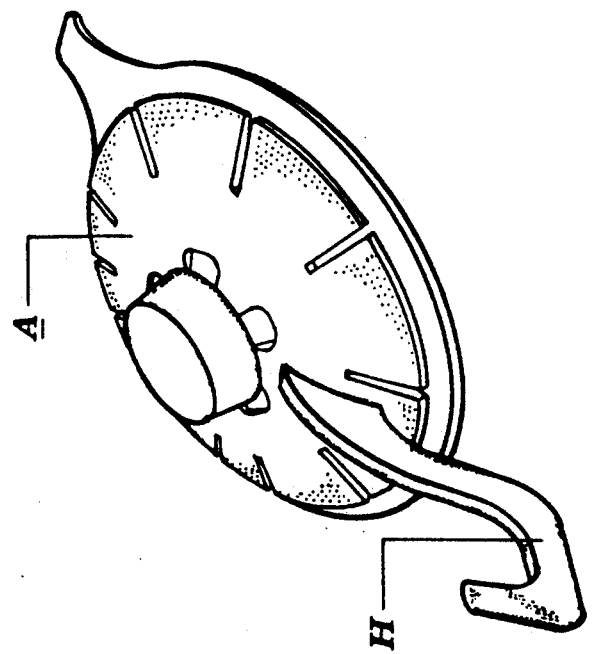
FIG. 10 is a perspective view showing a thirteenth preferred embodiment of a sucker according to the present invention.

As shown in FIG. 10, a resilient member A according to the present invention can attach thereto a hooking member H so that the attaching surface for the present sucker/hook will not be contaminated or damaged.

In sum, the advantages achieved by the present sucker can be summarized as follows:

1) The present sucker not only can be effectively attached to the attaching surface but also can be made to be detachable from the attaching surface in a more easier manner.
2) Although subjected to severe atmospheric changes, the present sucker can still longstandingly work effectively.
3) Although inevitably subjected to the aging or the hardening of the used material of sucking body B, the present sucker can still longstandingly function normally.
4) The present sucker can successfully function on an irregular attaching surface.
5) The present sucker can structurally be diversified.
6) The present sucker can apparently be diversified.
7) The present sucker can functionally be diversified.

While the present invention has been described in connection with what is presently considered to be the most practical and preferred embodiments, it is to be understood that the invention is not to be limited to the disclosed embodiments but on the contrary, is intended to cover various modifications and equivalent arrangements included within the spirit and scope of the appended claims which scope is to be accorded the broadest interpretation so as to encompass all suck modifications and equivalent structures reasonably deemed by those skilled in the art.

What I claim is:

1. A suction cup device comprising:
   a downwardly concave sucking body having a first central portion and adapted to be downwardly pressed against an attaching surface to vacuumize a space defined between said sucking body and said attaching surface in order that said sucking body can thus be attached to said attaching surface;
   a downwardly concave resilient member superimposed above said sucking body, and having a second central portion, a periphery and a plurality of groves extending from said periphery inwardly; and
   a connector together said first and second central portions in a manner that after said sucking body has been pressed against said attaching surface, said resilient member will tend to urge said sucking body away from said attaching surface which will in turn result in that said sucking body is more effectively attached to said attaching surface.

2. The suction cup device according to claim 1 wherein said resilient member is larger than said sucking body in area.

3. The suction cup device according to claim 1 wherein said resilient member is smaller than said sucking body in area.

4. The suction cup device according to claim 1 wherein said resilient member and said sucking body are generally circular.

5. The suction cup device according to claim 1 wherein said resilient member and said sucking body are generally rectangular.

6. The suction cup device according to claim 1 wherein said resilient member and said sucking body are generally elliptical.

7. The suction cup device according to claim 1 wherein said grooves are generally straight and oriented toward said second central portion.

8. The suction cup device according to claim 1 wherein said grooves are generally curvy.

9. The suction cup device according to claim 1 wherein each of said grooves includes an elliptical portion and a straight portion.

10. The suction cup device according to claim 1 wherein said connector is integrally formed to said sucking body.

11. The suction cup device according to claim 1 wherein said connector is integrally formed to said resilient member.

12. The suction cup device according to claim 1 wherein said connector is partly implanted into said sucking body.

13. The suction cup device according to claim 12 wherein said connector has a threaded upper portion.

14. The suction cup device according to claim 12 wherein said connector has an H-shaped, vertical cross section in its upper portion thereof.

15. The suction cup device according to claim 1 wherein said second central portion is an opening capable of compelledly passing therethrough an upper portion of said connector.

16. The suction cup device according to claim 15 wherein said opening is gear-shaped.

17. The suction cup device according to claim 1, further comprising a stopper passing through said connector for stopping thereunder said resilient member 18. The suction cup device according to claim 1, further comprising a c-shaped stopper engaging with said connector for stopping thereunder said resilient member.

19. The suction cup device according to claim 1 wherein said sucking body includes an extension allowing said sucking body to be easily detached from said flat surface.

20. The suction cup device according to claim 1 comprising a hooking member attached to said resilient member.

* * * * *